United States Patent

Atmur et al.

[11] Patent Number: 5,879,640
[45] Date of Patent: *Mar. 9, 1999

[54] CERAMIC CATALYTIC CONVERTER

[75] Inventors: Steven Donald Atmur, Riverside; Thomas Edward Strasser, Corona, both of Calif.

[73] Assignee: Northrop Grumman Corporation, Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 844,936

[22] Filed: Apr. 23, 1997

Related U.S. Application Data

[63] Continuation of Ser. No. 515,850, Aug. 16, 1995, abandoned.

[51] Int. Cl.$^6$ ........................................ B01D 53/34
[52] U.S. Cl. ................... 422/180; 422/177; 422/179; 55/523; 55/DIG. 30
[58] Field of Search ................................ 422/171, 177, 422/179, 180, 190, 174, 176, 211, 222; 60/299; 55/523, DIG. 30; 264/62; 428/266, 244; 156/329

[56] References Cited

U.S. PATENT DOCUMENTS

| | | | |
|---|---|---|---|
| 3,880,969 | 4/1975 | Latos | 264/44 |
| 3,912,459 | 10/1975 | Kearsley | 422/180 |
| 4,067,829 | 1/1978 | Garrett | 521/91 |
| 4,206,598 | 6/1980 | Rao et al. | 60/282 |
| 4,207,660 | 6/1980 | Rao et al. | 29/888.01 |
| 4,233,361 | 11/1980 | Fultz | 428/313.5 |
| 4,245,611 | 1/1981 | Mitchell et al. | 123/669 |
| 4,294,788 | 10/1981 | Laskow et al. | 264/101 |
| 4,311,541 | 1/1982 | Fultz | 156/78 |
| 4,341,826 | 7/1982 | Prewo et al. | 428/428 |
| 4,432,207 | 2/1984 | Davis, Jr. et al. | 422/117 |
| 4,436,538 | 3/1984 | Tomita et al. | 422/179 |
| 4,606,434 | 8/1986 | Vasilow et al. | 188/1.11 |
| 4,657,951 | 4/1987 | Takarada et al. | 523/153 |
| 4,818,732 | 4/1989 | Fox et al. | 501/81 |
| 4,857,089 | 8/1989 | Kitagawa et al. | 422/180 |
| 4,884,400 | 12/1989 | Tanaka et al. | 60/323 |
| 4,887,518 | 12/1989 | Hayakawa | 92/212 |
| 4,928,645 | 5/1990 | Berneburg et al. | 123/188.3 |
| 4,973,674 | 11/1990 | Yamada et al. | 60/323 |
| 4,981,820 | 1/1991 | Renlund et al. | 501/39 |
| 5,000,136 | 3/1991 | Hansen et al. | 123/80 BB |
| 5,018,661 | 5/1991 | Cyb | 228/176 |
| 5,063,881 | 11/1991 | Kawamura | 123/1 A |
| 5,094,074 | 3/1992 | Nishizawa | 422/174 |
| 5,094,200 | 3/1992 | Fontichiaro | 123/188.3 |
| 5,114,262 | 3/1992 | Kojima | 403/150 |
| 5,126,087 | 6/1992 | Lespade et al. | 264/60 |
| 5,137,789 | 8/1992 | Kaushal | 428/472 |
| 5,140,813 | 8/1992 | Whittenberger | 60/300 |
| 5,177,961 | 1/1993 | Whittenberger | 422/176 |
| 5,180,694 | 1/1993 | Renlund et al. | 501/12 |
| 5,203,228 | 4/1993 | Miyawaki et al. | 74/579 R |
| 5,224,335 | 7/1993 | Yoshizaki | 60/300 |
| 5,224,572 | 6/1993 | Smolen, Jr. et al. | 428/335 |
| 5,225,283 | 7/1993 | Leung et al. | 428/408 |
| 5,231,059 | 7/1993 | Leung et al. | 501/12 |
| 5,244,720 | 9/1993 | Leung et al. | 428/266 |
| 5,258,084 | 11/1993 | Leung et al. | 156/89 |
| 5,404,721 | 4/1995 | Hartsock | 60/300 |

*Primary Examiner*—Hien Tran
*Attorney, Agent, or Firm*—Terry J. Anderson; Karl J. Hoch, Jr.

[57] ABSTRACT

A pollutant-reducing catalytic converter for an internal combustion engine. The catalytic converter is of ceramic and operates at higher temperatures for increased efficiency. A ceramic foam is used as the substrate for the catalyst. The foam is an open-celled foam and the substrate is deposited on the walls of the cells. Thus, there is a maximum area of catalyst with a minimum amount of catalyst required. The catalytic converter can be placed in the engine compartment adjacent the engine for maximum efficiency without causing temperature problems within the engine compartment.

4 Claims, 1 Drawing Sheet

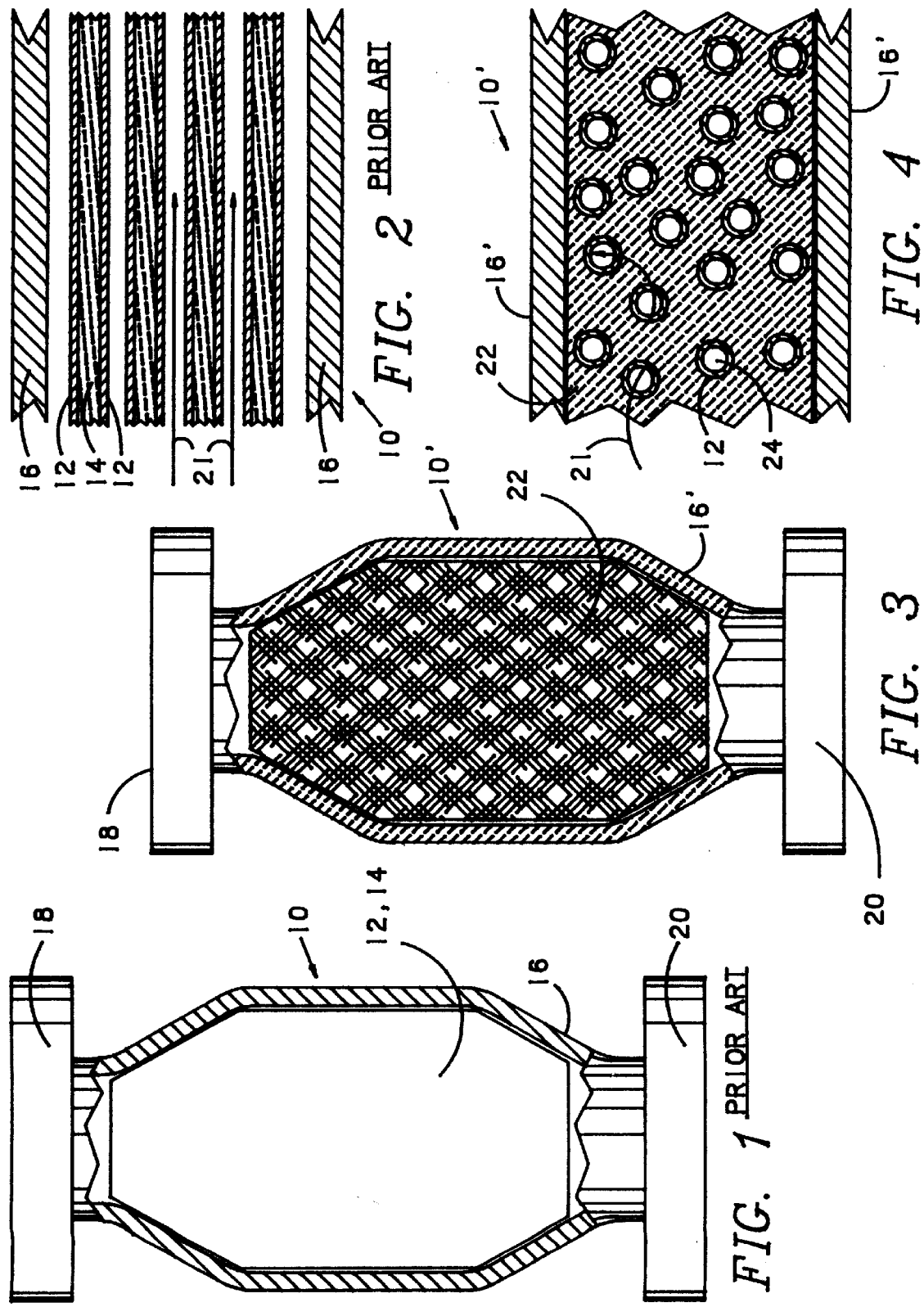

CERAMIC CATALYTIC CONVERTER

This is a continuation of application Ser. No. 08/515,850, filed Aug. 16, 1995, now abandoned.

BACKGROUND OF THE INVENTION

1. Technical Field

This invention relates to methods and apparatus for removing pollutants from the exhaust emissions of internal combustion engines and, more particularly, to a high efficiency catalytic converter for removing unburned pollutants from exhaust gases from an internal combustion engine or the like comprising, a catalytic chamber having an inlet connected to receive exhaust gases and an outlet therefrom, the catalytic chamber having walls of a structural fiber reinforced ceramic matrix composite (FRCMC) material comprising fibers of a generic fiber system disposed throughout a pre-ceramic resin in its ceramic state; a high temperature resistant, open celled foam disposed within the catalytic chamber within a path between the inlet and the outlet so that exhaust gases entering the inlet must pass through a cell path of the foam to exit through the outlet; and, a catalyst for unburned pollutants disposed on walls of cells of the foam.

2. Background Art

For many years, the exhaust systems of automobiles have remained substantially unchanged. There is an exhaust manifold that collects the exhaust gases emitted from the exhaust ports of the engine and outputs them into an exhaust pipe which conducts the gases to the rear of the automobile. Typically, a muffler is disposed in-line with the exhaust pipe to muffle the sounds of the gases to an acceptable level. More recently, modern exhaust systems have included a catalytic converter to complete the oxidation process of unburned particles emitted from the engine, thus reducing pollutants from the exhaust gases. In a typical prior art exhaust system of such design, the exhaust manifold is bolted or clamped to the engine and the output from the manifold is connected to an exhaust front pipe which, in turn, is connected to the catalytic converter.

As depicted in FIGS. 1 and 2, a catalytic converter 10 is nothing more than a catalyst 12 on a substrate 14. Typically, as depicted in FIG. 1, the substrates 14 are stacked in spaced parallel relationship within a metal container 16 having an inlet 18 and an outlet 20. When hot enough, the catalyst 12 causes unburned pollutants and fuel in the exhaust gases 21 passing therethrough to be further oxidized.

Thus, the efficiency of the catalytic converter 10 is directly proportional to its temperature of operation, the amount of contact area, and time of contact the exhaust gases 21 have with the catalyst 12. The above described prior art catalytic converter 10 of FIGS. 1 and 2 leaves a lot to be desired in that regard. The amount of pollutants and unburned fuel removed from the exhaust gases 21 is a function of their exposure to the catalyst 12. If there is a large area of contact, a short time is sufficient. If there is a small area of contact, a longer time of contact is required for all the pollutants and unburned fuel to contact the catalyst 12. Because of the manner of having the catalyst 12 carried by the stacked substrates 14 (or a similar arrangement) the area-to-volume ratio of the catalyst 12 is not large, the path is not conducive to maximum exposure of the exhaust gases 21 to the catalyst 12, and, additionally, the time that the exhaust gases 21 are exposed to the catalyst 12 is minimal.

Another problem with prior art catalytic converters is that because they get so hot, they must be placed outside of the engine compartment and under the vehicle. They are far from the engine itself where they could do the most good. Thus, it would be desirable to build the catalytic converter from a material that could not only withstand the required temperatures; but, in addition, be of an insulating nature so as to be able to contain the high temperatures within the catalytic converter and not pass them into the surrounding area. In that way, the catalytic converter could be moved into the engine compartment and closer to the engine without creating engine compartment temperature issues.

Wherefore, it is an object of the present invention to provide a catalytic converter which operates at a very high temperature.

It is another object of the present invention to provide a catalytic converter which is highly effective in eliminating pollutants from exhaust gases.

It is still another object of the present invention to provide a catalytic converter which provides a large area of catalyst for contact with exhaust gases in a minimum volume.

It is yet another object of the present invention to provide a catalytic converter which can be placed in the engine compartment as close to the engine as possible without creating engine compartment temperature problems.

Other objects and benefits of this invention will become apparent from the description which follows hereinafter when read in conjunction with the drawing figures which accompany it.

SUMMARY OF THE DISCLOSURE

The foregoing objects have been achieved by the method of the present invention for making a high efficiency catalytic converter for removing unburned hydrocarbon pollutants from exhaust gases from an internal combustion engine or the like comprising the steps of, forming a catalytic chamber having an inlet connected to receive exhaust gases and an outlet therefrom and further having walls of a structural fiber reinforced ceramic matrix composite material comprising fibers of a generic fiber system disposed throughout a polymer derived ceramic resin; disposing a high temperature resistant, open celled foam within the catalytic chamber within a path between the inlet and the outlet so that exhaust gases entering the inlet must pass through a cell path of the foam to exit through the outlet; and, depositing a catalyst for unburned hydrocarbon pollutants on walls of cells of the foam.

In the preferred embodiment, the step which includes forming walls of a catalytic chamber of a structural fiber reinforced ceramic matrix composite material comprising fibers comprising one or more materials selected from a generic fiber system (which can be one or more materials selected from Alumina, Nextel 312, Nextel 440, Nextel 510, Nextel 550, Silicon Nitride, Silicon Carbide, HPZ, Graphite, Carbon, and Peat) disposed throughout a pre-ceramic resin in its ceramic state includes the steps of forming the walls of fibers of Alumina, Altex, Nextel 312, Nextel 440, Nextel 510, Nextel 550, Silicon Nitride, Silicon Carbide, a polysilazane-derived Si-N-C fiber (commonly known as HPZ), Graphite, Carbon, and Peat; saturating the fibers with Silicon-Carboxyl resin, Alumina Silicate resin, or Monoaluminum Phosphate (also known as Monoalumino Phosphate) resin; and, firing the fiber-saturated walls at a temperature and for a time which converts the resin into a ceramic.

In one embodiment, the step of disposing a high temperature resistant, open cell ceramic foam within the catalytic chamber comprises the step of creating an open-celled foam of polymer derived ceramic resin within the catalytic chamber.

In another embodiment, that step comprises co-curing the FRCMC structural shell around a high temperature resistant, open cell ceramic foam within the catalytic chamber.

In one approach to the step of depositing a catalyst for unburned hydrocarbon pollutants on walls of cells of the foam, the step comprises depositing catalyst on the walls of the cells of the foam by chemical deposition.

In another approach, that step comprises the step of using an electrically-conductive, open-celled ceramic foam; and, the step of depositing a catalyst for unburned hydrocarbon pollutants on walls of cells of the foam comprises, immersing the foam in an electroplating solution of the catalyst, connecting the foam as one electrode of an electroplating system, and electroplating the catalyst on the walls of the cells of the foam.

BRIEF DESCRIPTION OF THE DRAWINGS

FIG. 1 is a simplified partially cutaway drawing of a prior art catalytic converter.

FIG. 2 is an enlarged cutaway drawing of the catalytic converter of FIG. 1.

FIG. 3 is a simplified partially cutaway drawing of a catalytic converter according to the present invention in a preferred embodiment thereof.

FIG. 4 is an enlarged cutaway drawing of the catalytic converter of FIG. 3.

DETAILED DESCRIPTION OF THE PREFERRED EMBODIMENT

In a co-pending application entitled HIGH-EFFICIENCY, LOW-POLLUTION ENGINE by the inventors herein filed on even date herewith and assigned to the common assignee of this application, an improved structural FRCMC material is disclosed having high breakage resistance and particular applicability to use for parts in a high temperature internal combustion engine. That engine obtains its objectives in large part because of its ability to operate at very high temperatures which result in more complete burning of the fuel. Thus, it should emit fewer pollutants in its exhaust gases. To further aid in the reduction of actual pollutants emitted, a catalytic converter can still be employed to advantage. The present invention is particularly suited for use with that engine to take advantage of the higher temperature exhaust gases produced thereby.

As depicted in FIG. 3, the catalytic converter 10' of the present invention employs a chamber 16' made of the same structural fiber reinforced ceramic matrix composite material so as to be able to withstand the high temperatures. Thus, it is preferred that the chamber 16' have a single layer wall of a ceramic matrix composite material comprising a ceramic matrix having fibers of a generic fiber system disposed throughout. The preferred FRCMC material employs any of several pre-ceramic resins commercially available such as Silicon-Carboxyl resin (sold by Allied Signal under the trade name Blackglas), Alumina Silicated resin (sold by Applied Poleramics under the product designation CO2), or Monoaluminum Phosphate (also known as Monoalumino Phosphate) resin, combined with a generic fiber system such as, but not limited to, Alumina, Altex, Nextel 312, Nextel 440, Nextel 510, Nextel 550, Silicon Nitride, Silicon Carbide, HPZ, Graphite, Carbon, and Peat. To add additional toughness qualities to the material, the fiber system is first coated to 0.1–5.0 microns thickness with an interface material such as Carbon, Silicon Nitride, Silicon Carboxyl, Silicon Carbide or Boron Nitride or a layered combination of one or more of the above interfacial materials. The interface material prevents the resin from adhering directly to the fibers of the fiber system. Thus, when the resin has converted to a ceramic, there is a slight play between the ceramic and fibers imparting the desired qualities to the final fiber reinforced ceramic matrix composite (FRCMC).

To achieve the objective of providing a maximum area of catalyst for contact with a minimum of catalyst volume employed, the prior art substrate is replaced by an open-celled ceramic foam 22 having the catalyst 12 disposed on the walls of the cells 24 thereof. While any type of foam capable of withstanding the temperatures involved can be employed as the foam 22, as depicted in FIG. 4, the multitude of cells 24 provide a myriad of paths lined with the catalyst 12 for the exhaust gases 21 to pass through. Thus, the total wetted surface area of catalyst 12 is quite large as desired.

The method of manufacture of the catalytic converter 10' of this invention is also quite simple as compared with prior art catalytic converters. The chamber 16' can be made by molding the FRCMC material and then firing it to convert the resin into a ceramic. If desired, the chamber 16' can then be placed in a protective metal housing or a protective metal housing can actually be cast around the chamber 16'.

The foam used as the ceramic foam 22 can be any generic ceramic foam such as Silicon Carbide foam. Such a foam could either be manufactured or machined to the inside shape of the catalytic converter 10'. The FRCMC could be molded around the foam 22 according to techniques described in the co-pending applications of the inventors herein and the components then cured and fired together prior to catalyst deposition. Silicon Carbide foam is conductive and the catalyst 12 could be applied by an electroplating process, for example.

In a preferred approach, once the chamber 16' is prepared, the foam 22 can be created within the chamber 16' according to techniques described in co-pending application Ser. No. 08/515,928 filed Aug. 16, 1995 by Daws et al. entitled CERAMIC FOAM AND METHODS FOR PRODUCING SAME. That application is assigned to the common assignee of this application and the teachings thereof are incorporated herein by reference. By so doing, the entire cross sectional area of the path through the chamber 16' between the inlet 18 and outlet 20 is filled with the foam 22 so that the exhaust gases 21 must pass through the foam 22 and over the catalyst 12.

Once the foam 22 is in place, the catalyst can be applied to the walls of the cells 24 by any of several methods well known to those of ordinary skill in the art such as chemical deposition. It should be noted in this regard that the ceramic foam of the Daws et al. application can be made electrically conductive. Therefore, it should be possible to apply the catalyst 12 as a very thin layer using conventional electroplating techniques by placing the chamber 16' containing the foam 22 into an electroplating solution of the catalyst and electrically connecting the foam 22 into the system as one electrode thereof.

Wherefore, having thus described the present invention, what is claimed is:

1. A catalytic converter for controlling pollution from exhaust gases of an internal combustion engine, said converter comprising:

a) a catalytic chamber having an inlet connectable to an internal combustion engine to collect exhaust gases therefrom and an outlet, said chamber constructed of a single layer wall fabricated of a ceramic matrix composite material comprising a polymer-derived ceramic resin with reinforcing fibers dispersed therein;

b) a high-temperature resistant open-celled foam disposed within the chamber and situated such that exhaust gases entering said chamber pass in contact with the foam between the inlet and the outlet of the chamber; and c) a catalyst disposed on the foam for pollution treatment of said exhaust gases.

2. A catalytic converter as claimed in claim 1 wherein the ceramic resin is selected from the group consisting of silicon-carboxyl resin, monoaluminum phosphate resin, and alumina silicate resin, and wherein the reinforcing fibers are constructed of a material selected from the group consisting of alumina, Nextel 312, Nextel 440, Nextel 510, Nextel 550, silicon nitride, silicon carbide, HPZ, graphite, carbon, peat, and mixtures thereof.

3. A catalytic converter as claimed in claim 1 wherein the foam is a polymer-derived foam ceramic resin.

4. A catalytic converter for controlling pollution from exhaust gases of an internal combustion engine, said converter comprising:

a) a catalytic chamber having an inlet connectable to an internal combustion engine to collect exhaust gases therefrom and an outlet, said chamber constructed of a single layer wall fabricated of a ceramic matrix composite material comprising a polymer-derived ceramic resin with reinforcing fibers dispersed therein, with said ceramic resin selected from the group consisting of silicon-carboxyl resin, monoaluminum phosphate resin, and alumina silicate resin, and said reinforcing fibers constructed of a material selected from the group consisting of alumina, Nextel 312, Nextel 440, Nextel 510, Nextel 550, silicon nitride, silicon carbide, HPZ, graphite, carbon, peat, and mixtures thereof;

b) a high-temperature resistant open-celled foam disposed within the chamber and situated such that exhaust gases entering said chamber pass in contact with the foam between the inlet and the outlet of the chamber, wherein said foam is a polymer-derived from ceramic resin; and c) a catalyst disposed on the foam for pollution treatment of said exhaust gases.

\* \* \* \* \*